United States Patent [19]

Lowe

[11] Patent Number: 5,651,637
[45] Date of Patent: Jul. 29, 1997

[54] ROAD BED CONSTRUCTION

[75] Inventor: George E. Lowe, LaPlace, La.

[73] Assignee: Marathon Oil Company, Findlay, Ohio

[21] Appl. No.: 418,033

[22] Filed: Apr. 6, 1995

Related U.S. Application Data

[62] Division of Ser. No. 157,859, Nov. 24, 1993, abandoned.

[51] Int. Cl.$^6$ ............................................. C08L 95/00
[52] U.S. Cl. ...................... 404/17; 106/273.1; 106/277; 404/27
[58] Field of Search .................. 404/17, 27, 31, 404/81, 82; 52/DIG. 9; 106/276, 277, 273.1, 281.1, 284.04; 427/138

[56] References Cited

U.S. PATENT DOCUMENTS

| | | | |
|---|---|---|---|
| 2,085,420 | 6/1937 | Day | 404/82 X |
| 2,402,597 | 6/1946 | Bourcher | 404/27 |
| 3,923,537 | 12/1975 | Wood | 106/8.5 |
| 4,073,659 | 2/1978 | Burris | 106/277 |
| 4,170,484 | 10/1979 | Crawford et al. | 106/281 N |
| 4,268,318 | 5/1981 | Stone | 106/277 |
| 4,437,896 | 3/1984 | Partanen | 106/273 R |
| 4,621,108 | 11/1986 | Burris | 523/340 |
| 4,683,005 | 7/1987 | Poirier | 106/273 R |
| 4,708,516 | 11/1987 | Miller | 404/31 |
| 4,777,064 | 10/1988 | Stone | 427/138 |
| 4,851,260 | 7/1989 | Stone | 427/138 |
| 4,904,305 | 2/1990 | Zanzotto et al. | 106/284 |

FOREIGN PATENT DOCUMENTS

| | | | |
|---|---|---|---|
| 408318 | 11/1970 | Australia | 106/284.01 |

*Primary Examiner*—James Lisehora
*Attorney, Agent, or Firm*—Jack L. Hummel; Jack E. Ebel

[57] ABSTRACT

An asphaltic roadway base or sub base which includes a by-product of petroleum refining units utilizing a Residuum Oil Supercritical Extraction (ROSE) process. The base course is a designed mixture of a resin-asphaltene residuum and aggregate, wherein the resin-asphaltene residuum has a penetration less than 10 at 77° F. and a softening point above 150° F., the resin-asphaltene residuum is present in the range of 3% to 12%, by weight of the composition, and the aggregate is present in the range of 88% to 97%, by weight of the composition.

8 Claims, 1 Drawing Sheet

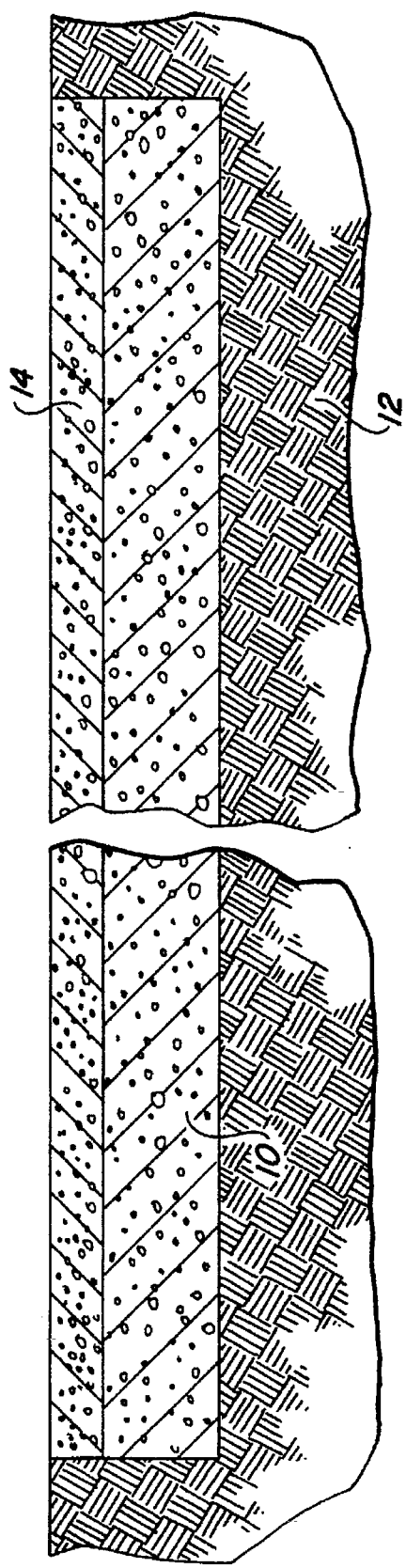

ROAD BED CONSTRUCTION

This is a divisional application of application Ser. No. 08/157,859 filed Nov. 24, 1993, now abandoned.

FIELD OF INVENTION

This invention is related to roadway and other types of contructions where a flexible base material is required. More particularly, it relates to a composition for a base course or sub base.

BACKGROUND OF THE INVENTION

In the construction of paved roadways the top wear layer often consists of a mixture of paving grade asphalt and aggregate. The asphalt employed for this purpose must be capable of readily being applied in molten condition, and the mixture must have flow values that are not so high as to allow the mix to distort easily under heavy loads, nor so low as to make the mix brittle and subject to cracking. Paving grade asphalts are sometimes blended with harder asphalts in order to extend the paving grade asphalt and to provide a commercial use for hard asphalts that otherwise have only limited use. One material which has been suggested as a suitable blend ingredient in a paving grade asphalt blend is a by-product of petroleum refining units utilizing a Residuum Oil Supercritical Extraction (ROSE) process. The by-product is a resin-asphaltene residuum that is very hard, with penetration of less than 10 at 77° F. and a softening point above 150° F., and has a high sulfur and metal content. The primary methods of disposing of this material have been to treat it as waste, with the concomitant problems of hazardous waste disposal, or to blend it with low-sulfur diesel and kerosene cutters to make a saleable fuel. Such fuel can be quite expensive, however, due to the value of the cutters, and may contain more sulfur than is desirable. Although use of the resin-asphalt residuum as a blend ingredient in asphalt paving is viable in certain minor amounts and under proper conditions, such use can account for the disposal of only minor amounts of the residuum.

The sub base, or base layer, of a paved roadway has different requirements than those of the surface layer. The road bed should be firm, yet flexible and compatible with the asphalt cover layer. Density and water penetration properties should be dictated by design. A common material used as a road bed is soil cement which, although initially inexpensive, is quite rigid and susceptible to cracking. The cracks reflect through the flexible surface layer, allowing water intrusion into the sub-base soils, which promotes further roadway deterioration. The introduction of water into a soil containing clay or other material that tends to become unstable when wet is especially detrimental.

It is an object of the invention to provide a suitable composition for sub base and base materials which will better meet the needs of the construction industry. Another object is to find a suitable large-scale use for resin-asphaltene residuum of the type referred to above.

SUMMARY OF THE INVENTION

It has been found that although resin-asphaltene residuum from the ROSE process is too hard to enable it to function as an asphalt binder in wearing course and binder course mixes, when combined with aggregate the resulting mix has the necessary qualities to function as the base or sub base course of a road. An asphaltic sub road bed constructed in accordance with the invention is comprised of a designed mixture of a resin-asphaltene residuum has a penetration less than 10 at 77° F. and a softening point above 150° F., the resin-asphaltene residuum being present in the range of 3% to 12%, by weight of the composition, and the aggregate being present in the range of 88% to 97%, by weight of the composition. The nominal maximum aggregate size will typically be 3 inches or less. the aggregate itself may be comprised of various types of granular materials commonly used in mad base construction.

The resulting base material is more flexible than soil cement and not as susceptible to cracking. The blended materials benefit from a higher structural coefficient, which permits thinner base and sub base sections for a give traffic loading situation. The base material is also a more cost effective mixture than mixtures containing standard asphaltic cements.

BRIEF DESCRIPTION OF THE DRAWING

The sole figure of the drawing is a transverse sectional view of a road base incorporating the composition of the invention.

DETAILED DESCRIPTION OF THE PREFERRED EMBODIMENT

As mentioned above, the resin-asphaltene residuum is hard, having a penetration less than 10 at 77° F. and a softening point greater than 150° F. The aggregate it is mixed with may vary as to type and amount, but in general it should be present in the composition in the range of 88% to 97%, by dry weight of the composition, leaving the resin-asphaltene residuum present in the amount of 3% to 12%, by dry weight of the composition. The aggregates proposed for use should be evaluated with the residuum to determine the proper mix design. In general, they may be comprised of various types of granular material commonly used in road base construction, including but not limited to, stones, gravel, expanded aggregate, shells, ground silica, recycled asphalt and portland cement pavement and catalytic cracking catalyst fines and other materials having complex microstructure, such as mol sieves and HDS catalyst base. As stated, the aggregate may be of any practicable size, not more than about 3 inches.

Surprisingly, the resin-asphaltene residuum need not be blended with any other type of asphaltic material in order to provide a suitable base composition. The resulting composition provides a firm layer which is both flexible and compatible with the asphalt cover layer.

To form a road base, the composition of the invention is laid down and compacted as the base layer 10, shown in the drawing, on a suitably prepared surface 12. Although the prepared surface is illustrated as a ground surface, it may instead be a sub base layer. Subsequently, a wearing or binder layer 14 is laid on top of the base layer to form the finished roadway.

The material of the invention may be utilized in either molten or emulsified form, depending on conditions and availability of equipment. A hot application does not require any manipulation after leaving the refinery, but because of the high melt point of the composition it must be maintained at temperatures of at least 300° F., to maintain it in liquid form. Mixing of the resin-asphaltene residuum with aggregate does not require any special treatment and can be carried out in conventional mixing equipment. The mixing temperature should be at a high enough level, such as 350° F., to maintain the composition in fluid form to allow thorough mixing. If emulsified applications are preferred, the residuum is mixed with water and an emulsifying agent. Mixing of the emulsification with aggregate can then be carried out on conventional equipment and the mixture laid down as is well known in the industry.

The invention thus makes use of resin-asphaltene residuum from the ROSE process that is too hard to be used as a binder in wearing course and binder course mixtures. The base mixture is not as susceptible to cracking, permits thinner base and sub base sections due to its higher structural coefficient and is more cost effective mixture than mixtures containing standard asphaltic cements.

It will be appreciated that practice of the invention is not necessarily limited to all the specific details described in connection with the preferred embodiment, except as they may be within the scope of the appended claims. Changes to certain features of the preferred embodiment which do not alter the overall basic function and concept of the invention are therefore contemplated.

What is claimed is:

1. A base course for a paved roadway consisting essentially of:
  a mixture of a resin-asphaltene residuum and aggregate, wherein the resin-asphaltene residuum has a penetration of less than 10 at 77° F. and a softening point above 150° F., the resin-asphaltene residuum being present in the range of 3% to 12%, by weight of the mixture, and the aggregate being present in the range 88% to 97%, by weight of the mixture.

2. The base course of the claim 1, wherein the maximum aggregate size is 3 inches.

3. The base course of claim 1, wherein the aggregate comprises one or more ingredients selected from the group consisting of stones, gravel, expanded aggregate, shells, ground silica, recycled asphalt and portland cement pavement and materials having complex microstructure.

4. The base course of claim 1 wherein said mixture further contains water and an emulsifying agent which are added to said resin-asphaltene residuum to form an emulsification.

5. A paved roadway, comprising:
  a surface wear course; and
  a base course consisting essentially of a mixture of a resin-asphaltene residuum and aggregate, wherein the resin-asphaltene residuum has a penetration of less than 10 at 77° F. and a softening point above 150° F., the resin-asphaltene residuum being present in the range of 3% to 12%, by weight of the mixture, and the aggregate being present in the range of 88% to 97%, by weight of the mixture.

6. The paved roadway of claim 5, wherein the maximum aggregate size is 3 inches.

7. The paved roadway of claim 5, wherein the aggregate comprises one or more ingredients selected from the group consisting of stones, gravel, expanded aggregate, shells, ground silica, recycled asphalt and portland cement pavement and materials having complex microstructure.

8. The paved roadway of claim 5, wherein said mixture further contains water and an emulsifying agent which are added to said resin-asphaltene residuum to form an emulsification.

* * * * *